March 15, 1960 J. MAHLER 2,928,131
LIGHT DIFFUSING MEANS AND METHOD OF MAKING SAME
Filed April 23, 1957 3 Sheets-Sheet 1
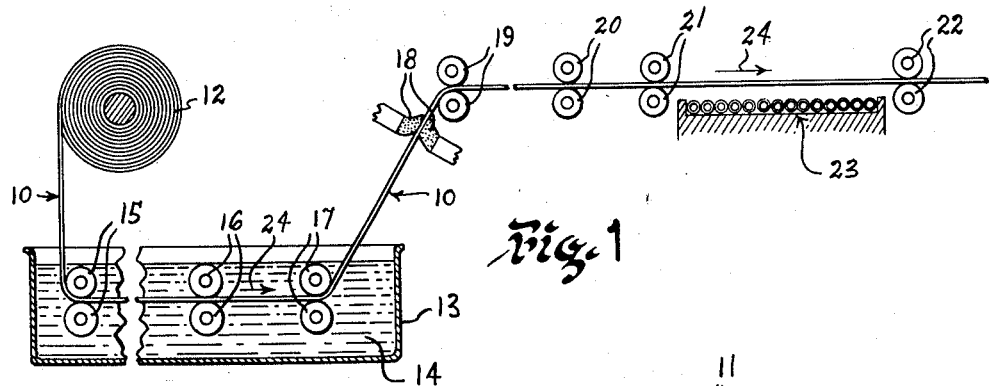
Fig. 1
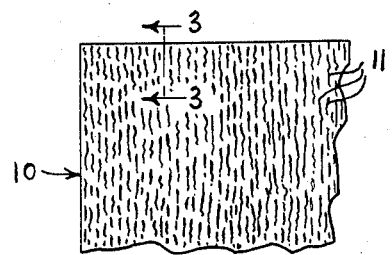
Fig. 2
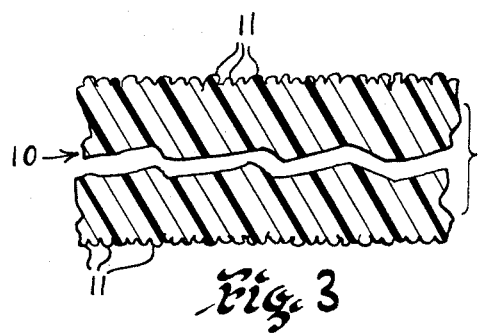
Fig. 3
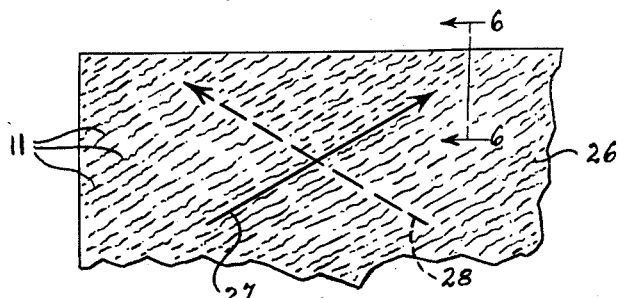
Fig. 5
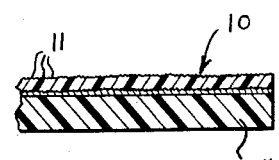
Fig. 4
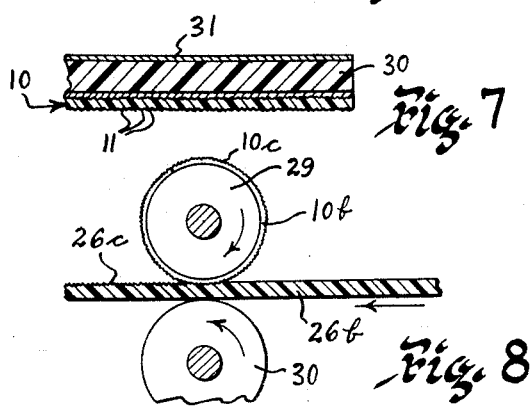
Fig. 7
Fig. 8
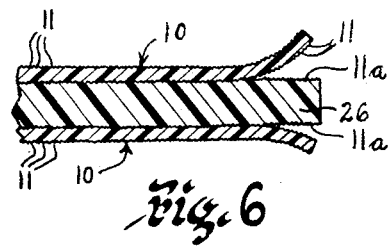
Fig. 6
INVENTOR
JOSEPH MAHLER
BY
Louis K. Gagnon
ATTORNEY March 15, 1960  J. MAHLER  2,928,131
LIGHT DIFFUSING MEANS AND METHOD OF MAKING SAME
Filed April 23, 1957  3 Sheets-Sheet 2

INVENTOR
JOSEPH MAHLER
BY
Louis L. Gagnon
ATTORNEY

INVENTOR
JOSEPH MAHLER
BY
Louis L. Gagnon
ATTORNEY

United States Patent Office 2,928,131
Patented Mar. 15, 1960

2,928,131

LIGHT DIFFUSING MEANS AND METHOD OF MAKING SAME

Joseph Mahler, Fiskdale, Mass., assignor to American Optical Company, Southbridge, Mass., a voluntary association of Massachusetts Application April 23, 1957, Serial No. 654,483

8 Claims. (Cl. 18—48)

This invention relates to improved light-diffusing means and has particular reference to the provision of a novel film possessing such characteristics and method of making same.

In conventional light-diffusing devices such as rear-type projection screens, view finders or other similar light-diffusing means, a considerable amount of light passing through or reflected therefrom is randomly diverted in directions away from a desired viewing position and results in a substantial reduction in the brilliancy of a projected image when viewed thereon. Moreover, the randomly scattered light will cause said image to be seen in various contrasting degrees of brilliancy particularly when viewed from different angles relative to said light-diffusing device. Such conditions have, therefore, imposed considerable limitations upon the use of devices of the above character and greatly reduced the efficiency thereof.

Accordingly, it is a primary object of the present invention to provide novel light-diffusing means having controlled light-dispersion characteristics and method of making the same whereby greater concentration of light and increased brilliancy and definition of image may be obtained.

Another object is to provide novel means and method of producing light-diffusing devices of the above character which are adapted to conserve the light projected thereupon and have better fidelity and less scintillation than has heretofore been accomplished in such devices.

Another object is to provide simple and economical means and method of providing directional light-diffusing devices wherein light when projected thereon will be spread by said devices substantially uniformly thereover in directions controlled in accordance with the particular illuminating characteristics desired.

Another object is to provide light-diffusing means of the above nature which may be so controlled in character as to provide increased illumination of an object or picture projected thereon when viewed from predetermined angles other than normal thereto.

Another object is the provision of novel means and method of directionally controlling the spread of light from light-diffusing means of the above character throughout any desired angle in the horizontal and/or vertical meridian.

Another object is to provide light-diffusing means of plastic sheet-like material having a plurality of adjacent microscopic irregularly contoured cylindrically shaped lenticular portions or configurations formed on each side thereof and arranged in substantially the same oriented direction relative to each other while being of various lengths and randomly spaced to diffuse light projected therethrough or reflected therefrom while producing substantially no diffraction or moire effect of said light.

A further object is to provide novel means and method of transferring the characteristics of a light-diffusing film of the above nature by providing a master film and thereafter forming, from said master film, other light-diffusing members having substantially contra-generic surface characteristics or configurations similar to that of the master film surface and possessing similar diffusion characteristics.

A still further object is the provision of novel means and method of relatively rapidly, efficiently and economically producing light-diffusing surfaces having directionally controlled light-dispersion characteristics upon film-like material and thereafter producing, from said film-like material, a plurality of other light-diffusing surfaces having effectively similar characteristics upon materials differing in nature from said first film-like material.

Other objects and advantages of the invention will become apparent from the following description when taken in conjunction with the accompanying drawings in which:

Fig. 1 is a diagrammatic illustration of a means for forming a film of the type embodying the invention;

Fig. 2 is a fragmentary plan view of said film diagrammatically illustrating the surface texture thereof;

Fig. 3 is an enlarged fragmentary cross-sectional view taken on line 3—3 of Fig. 2 looking in the direction of the arrows;

Fig. 4 is an enlarged fragmentary cross-sectional view of a modified form of the invention;

Fig. 5 is a fragmentary plan view of a further modification of the invention;

Fig. 6 is an enlarged cross-sectional view taken on line 6—6 of Fig. 5 looking in the direction of the arrows;

Fig. 7 is an enlarged fragmentary cross-sectional view of a still further modified form of the invention;

Fig. 8 is a diagrammatic view of a further modification of the invention;

Figure 9:
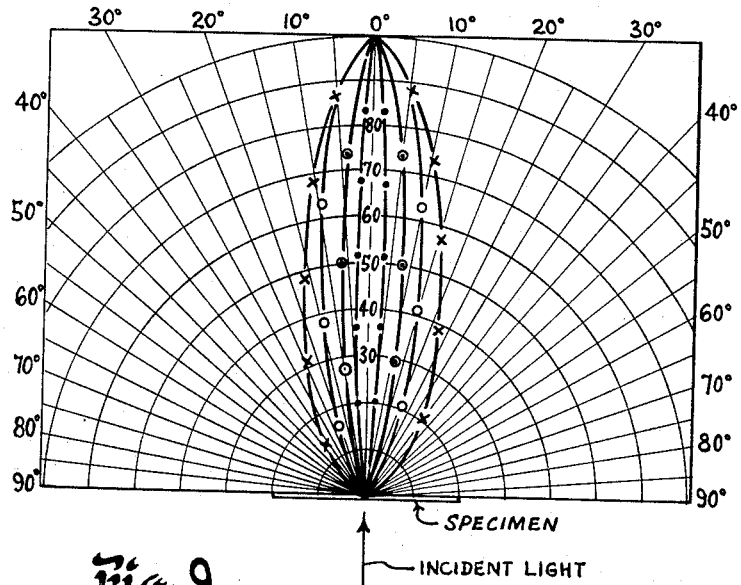
Fig. 9 is a face view of a chart illustrating the comparative vertical light-transmission diffusing characteristics of the present invention with other known light-diffusing sheetings.
Figure 10:
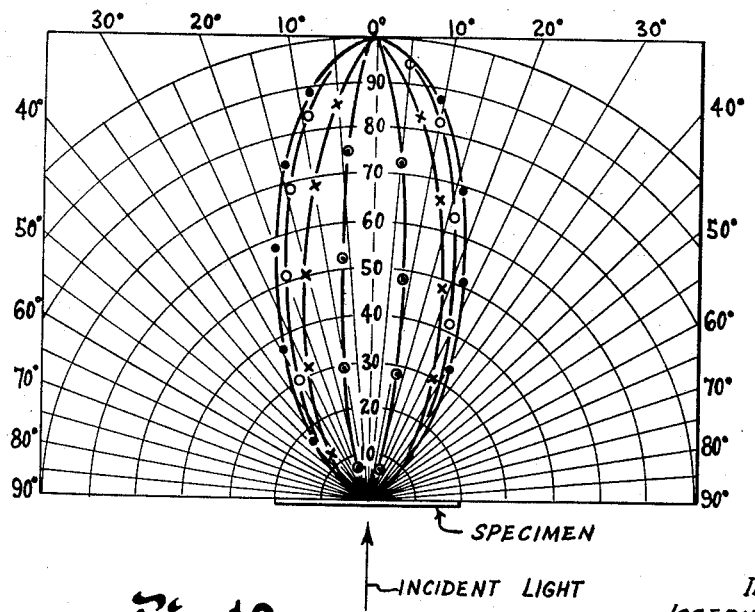
Figure 11:
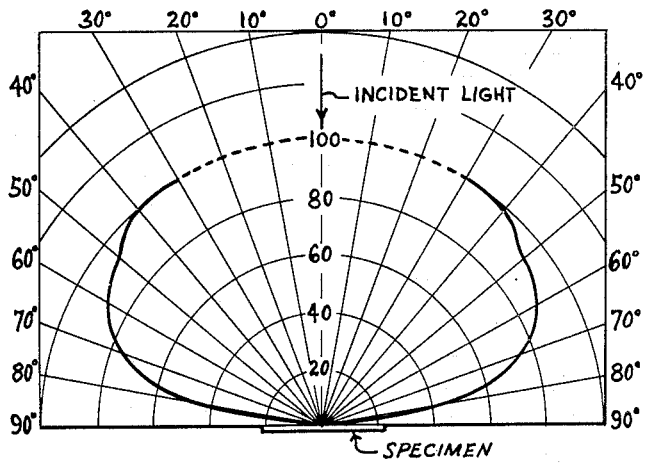
Figure 12:
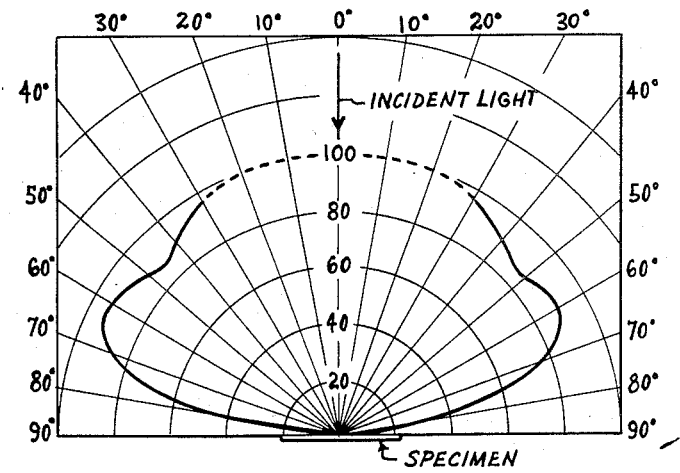
Figure 13:
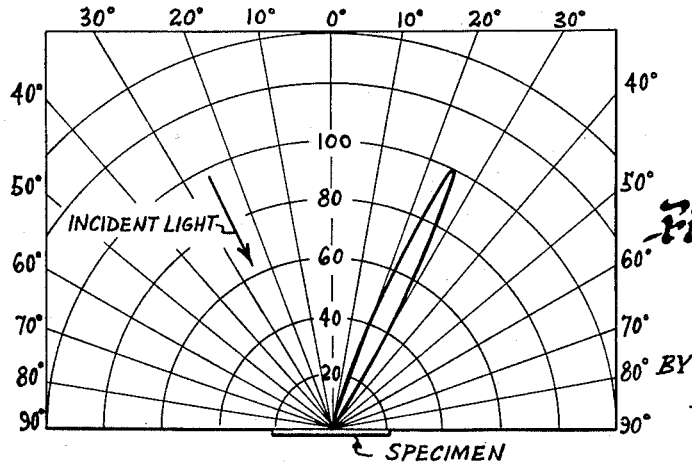

Fig. 10 is a chart similar to Fig. 9 illustrating the horizontal light-transmission diffusing characteristics of the present invention with other known light-diffusing sheetings; and Figs. 11, 12 and 13 are charts similar in character to those of Figs. 9 and 10 and illustrating comparative vertical and horizontal light-reflecting characteristics of a modified form of the present invention with another known light-reflective material commonly used as a standard for such comparisons.

Referring more particularly to the drawings wherein like characters of reference designate like parts throughout the various views, a light-diffusing film 10 of the type embodying the invention is shown in Figs. 2 and 3. Film 10 is formed of a relatively thin transparent plastic sheet of polyvinyl alcohol having its side surfaces composed of a plurality of irregularly contoured microscopic cylindrically shaped raised portions or ridges 11 oriented substantially in the same directional relation with each other and of various different lengths and configurations producing a design in relief having definite directional light-diffusing characteristics. This arrangement of ridges 11 provides an all-over light-diffusing surface texture on each side of film 10 which, due to the substantial similar directional relation of said ridges 11 causes a spreading or dispersion of light, passing through or reflected from said surfaces, to take place in directions normal to the longitudinal axes of ridges 11 with little spreading of said light in a direction along the axes thereof. Furthermore, the non-uniformity in the lengths and contours of ridges 11 substantially eliminates diffraction or what is commonly termed "moire" effect from taking place.

Ridges 11 are produced upon the polyvinyl alcohol film 10 by means of an apparatus such as diagrammatically illustrated in Fig. 1 wherein a roll 12 of polyvinyl alcohol film 10 is supported outwardly of the tank 13 of boric acid solution 14. Film 10 is passed from roll 12 into solution 14 between a plurality of successive pairs of supporting rollers 15, 16 and 17 respectively and thence outwardly of tank 13 between a pair of wiping members 18 and pairs of supporting rollers 19, 20, 21 and 22 in that order. A heating unit 23 is provided between rollers 21 and 22 in spaced adjacent relation with film 10 for performing a function of the process to follow.

It is pointed out that the above-described apparatus is given by way of illustration only and is designed to produce a continuous strip of diffusing film 10. However, film 10 may be processed in sheet-like form and in a similar sequence and manner by means of any suitable apparatus.

The processing of film 10 is as follows: Film 10, being initially in a relatively non-elastic state, is moved into solution 14 which comprises 2% to 10% boric acid in warm water and which is maintained between the temperatures of from 100° to 150° Fahrenheit. Room temperature possible, when low percentages of boric acid is used. It has been found preferable to use a 3% to 5% boric acid solution at a temperature of approximately 110° Fahrenheit. By so immersing the polyvinyl alcohol film, which is characteristically water-soluble, said film imbibes the boric acid solution and chemically assumes a highly elastic state. The chemistry of the reaction between the polyvinyl alcohol film and boric acid solution is considered to be accurately described by S. Saito, H. Okuyama, H. Kishimoto, and Y. Fujiyama, Kalloid Z., 144: 41–5, No. 1–3, November-December, 1955 in which it is stated that "the binding of boric acid to polyvinyl alcohol in aqueous solution was measured by the equilibrium dialysis technique. In the limit of infinite boric acid-polyvinyl alcohol ratio, one boric acid residue combines with two monomeric elements of the polyvinyl alcohol. From this, it was deduced that the boric acid is bound as the vicinal ester. From measurements of the binding at several temperatures, computations of the free energy of binding were made. The principal contribution to this is the entropy, which is supposed to be connected with increased randomization produced by the displacement of waters of hydration by the boric acid bound. Measurements of specific viscosity and turbidity as a function of the amount of boric acid added to a polyvinyl alcohol solution were made. With increasing boric acid concentration, the specific viscosity decreases and the turbidity increases. These data are interpreted in terms of increased cooling of the polymer molecules in solution as the binding of boric acid is increased. The solubility of the polymer containing bound boric acid is less at higher temperatures. The pH of boric acid is not increased significantly in dilute solutions of polyvinyl alcohol."

Rollers 15 and 16 which are approximately of the same diameter are each rotated at a predetermined common rate of speed and are so spaced apart in solution 14 as to cause the film upon reaching rollers 16 to attain a desired elastic state. Rollers 17 which are of approximately the same diameter, however, are rotated at an increased rate such as for example three times that of rollers 15 and 16 to cause a stretching of the now elasticized film 10 while maintaining said film in solution 14. By so doing, film 10, upon reaching rollers 17, will be stretched to approximately three times its initial length, or to the limit approaching its breaking point. This stretching causes the molecules of the polyvinyl alcohol film 10 to be elongated and oriented in the direction of travel 24 of said film. With rollers 19, 20, and 21 being of substantially the same diameters and rotated at the same rate of speed as that of rollers 17, to maintain film 10 in its stretched condition during its course of travel therebetween, the film 10 is passed from tank 13 between suitable wiping means 18 of sponge rubber or any other gentle material which will remove the excess boric acid solution from the film without marring the surface thereof or further stretching same. After having been sponge dried, film 10 passes between rollers 19 and 20 to be air dried. Rollers 19 and 20 are so spaced apart as to permit film 10 to become completely dried without the use of heat before reaching rollers 20. In order to speed up the above drying cycle and to enable the shortening of the distance between rollers 19 and 20, a blast of air at room temperature may be applied to the film. It is important, however, that no heat above room temperature be applied to the film at this time since heat will cause an undesirable hardening of the film 10 at this point of the process.

In order to produce the desired ridged effect on the surfaces of film 10, it is necessary to cause a relatively rapid contraction of the stretched and air dried film. This is accomplished by passing said film over heat of approximately 250° to 280° Fahrenheit. Heater 23, placed in close adjacent relation with film 10 is provided for this purpose and the extent of shrinkage of film 10 is limited by the related speed of travel of the rollers 21 and 22 and the related diameters of said rollers. In the specific case being illustrated, it is desired to permit the film 10 to shrink or retract a maximum amount and to accomplish this, the speed of rotation of rollers 22 is reduced relative to the speed of rotation of the rollers 21 an amount sufficient to permit such retraction. In this instance, the roller 22 is of approximately the same diameter as roller 21. This shrinking of film 10 causes a retraction of the stretched and oriented molecular structure thereof to produce ridges 11 of the character described above upon each of the side surfaces of film 10. Should the film 10 show a tendency to become wavy or deviate from a desired flatness, a suitable additional set of rollers travelling at a slightly greater speed of rotation than the rollers 22 and additional heating means may be provided to again tension the film by an amount sufficient to remove the waves and cause the film to assume the desired flatness. It has been found that by processing film 10 at the above-mentioned preferred temperatures, speeds and concentration of boric acid in solution 14 that said ridges will be randomly spaced approximately from four to eight microns apart. While the various rollers have been described as being of approximately the same diameters, it is to be understood that they may be made to different diameters and the speeds of rotation varied accordingly to accomplish the results desired.

Variations in the size and spacing of ridges 11 may be accomplished by variations in the temperatures and/or concentration of the above-mentioned boric acid solution. The extent of stretching and/or contraction of said film may also be controlled to produce different desired surface structures on film 10. It is particularly pointed out that control of the size and character of ridges 11 on film 10 may be accomplished by proper control of the above-mentioned variables, or combinations thereof, in the process.

An alternative method of forming ridges 11 on film 10 would be to heat soften and stretch said film a required amount to orient and elongate the molecular structure thereof prior to its immersion in the above-mentioned boric acid solution. The film 10 would then be boricated in the usual manner by immersion in solution 14, wiped, air dried, and contracted by the use of heat in accordance with the above-described procedure.

The polyvinyl alcohol film 10, after having been prepared as stated above, is no longer water-soluble and is impervious to moisture and is relatively brittle. In itself, the film 10 embodies many desirable optical characteristics such as, for example, its ability to directionally diffuse light without causing diffraction and provide increased illumination and definition of the picture image when projected thereon to an observer when directly viewed or viewed from angles other than normal to the plane of its surface.

It is pointed out that the polyvinyl alcohol film 10 may be either colorless or tinted to different colors. The coloring of film 10 may be accomplished in the conventional manner by dyeing it prior to its immersion in the boric acid solution 14. However, in preparing a colored film of the nature of the present invention, it has been found preferable to add a suitable water-soluble dye, such as any one of the commonly known aniline dyes, to the boric acid solution 14. Thus, as the film 10 imbibes the solution 14 in accordance with the above-described process, it will simultaneously become dyed to a desired color, the concentration of the dye in solution 14 and the time period of immersion in said solution being the controlling factors in the final density of the color in film 10. The tinting or dyeing of the light-diffusing film of the invention proves to be advantageous particularly when a light-filtering effect is desired in certain applications of its use. That is, by selecting the proper colors and densities thereof a finished light-diffusing film 10 would, in combination with its novel directional light-diffusing characteristics, provide a means for selectively filtering a light projected thereon when used in conjunction with illuminating devices or the like.

Since film 10, in its finished state, is relatively thin and quite brittle, it is preferable in certain applications of use, to provide a backing or supporting means for said film. This may be accomplished as shown in Fig. 5 by laminating film 10 to a transparent supporting sheet or backing 25 of acetate, Plexiglas or other material, by using a solvent such as, for example, acetone or other adhesive or bonding means which does not attack the polyvinyl alcohol film 10. Film 10 may be laminated to either or both sides of the supporting or backing sheet 25 to produce different desired optical effects.

In certain instances, it may be desirable to laminate film 10 to a supporting or backing sheet 25 by using a bonding material of the same index of refraction as that of the film 10. In such a case, the bonding material would fill in between the ridges 11 of the attached side of the film 10 and thus eliminate the light-diffusing effect of said attached side whereby the optical characteristics of only one side, that facing outwardly, of film 10 might be utilized.

Another preferred method of preserving the optical qualities of film 10 is to produce an intaglio of the original relief surface texture upon a more durable sheet material 26, see Fig. 6, such as cellulose acetate, butyrate, Plexiglas, polyvinyl chloride or other suitable sheet material preferably transparent by coating said material with a suitable solvent and pressing film 10 firmly thereagainst to cause ridges 11 to be transferred, impressed, or contra-generically produced in the coated surface of said material. It is pointed out that when coating vinyl materials, an organic solvent such, for example, as acetone alcohol or the like may be used whereas, when coating acetate materials, a solvent such as acetone may be used. Upon subsequent hardening of said coated surface, the film 10 is stripped off and the irregularly contoured convex cylindrical ridges 11 of film 10 will be transferred or contra-generically duplicated on material 26 as irregularly contoured cylindrically shaped concave depressions or configurations 11a, having light-diffusing optical characteristics similar to those of ridges 11. Gelatine materials may also be made in the above manner by the use of a related solvent which, in such a case, would be water. Similar impressions may be made by the use of film 10 by heating and softening the plastic supporting or backing sheet 26 and exerting pressure on the film 10 to force the relief surface thereof into the heat-softened sheet and thereafter allowing the sheet to harden. Upon removal of the film 10, it will leave an impression of its relief surface on said sheet and which has substantially the same light-diffusing characteristics.

Both sides of material 26 may be treated in the above manner as illustrated in Fig. 6 and the longitudinal axes of ridges 11 may be oriented at different related angles during the treatment of the opposed surfaces of material 26 to produce configurations 11a on one side of said material in crossed relation, as illustrated by arrow 27, with the configurations on the other side of said material, as illustrated by arrow 28. This crossing of configurations 11a will, in effect, cause the combination of said configurations to diffuse light passing therethrough in directions both vertically and horizontally. The amount of light deflected in either of said directions is determined by the angular relationship of the configurations 11a of each side of member 26. For example, if the configurations 11a on each side of material 26 were disposed at 90° to each other, substantially equal amounts of light would be deflected in both the vertical and horizontal meridians thereof. It is pointed out that in addition to controlling the axial relationship of the configurations 11a on the sides of a sheet material such as 26, the combination of various other light-diffusing effects might be accomplished on a single sheet of material 26 by forming various sections of the side surfaces thereof with different surface textures formed in accordance with the above-mentioned control of the size and character of the ridges or configurations 11 on the film material 10 and/or orienting the axial alignment of the surface configurations of various sections of said sheet 26 to different desired angular relationships with each other. That is, a center section of a sheet 26 may be provided with the surface configurations 11a thereof oriented in one direction and being different in character and alignment than its adjacent outer sections. Innumerable combinations of this sort could be arranged to produce substantially any desired control of the light-dispersion characteristics of a particular light-diffusing screen.

It is to be understood that one of the principal features of the invention is the provision of novel means and method for controlling the spread of diffused light. That is, causing said light, while being diffused, to be directed only to certain desired areas of use. Thus, the usual scattered or stray light common to prior devices of this nature is not only eliminated but is conserved so as to substantially increase the brilliance and definition of an object projected onto a device of the invention. In the case where the device of the invention is used as an illuminator in conjunction with a light source, such control of its light-diffusing properties will provide a conservation of substantially all of the light emanating from the light source by directing the light only to its intended area or direction of use and thereby permit the use of lower powered light sources in illuminators of this nature. This, of course, is advantageous particularly since the usually objectionable heat generated by an incandescent light source is more or less proportional to its wattage rating.

If it is desired to use the film 10 or a replica or transposition thereof as a front projection or reflective type of light-diffusing screen, one side of a film 10 or a replica thereof would be sprayed or otherwise coated with a reflective backing such as aluminum or the like. An example of such a reflective type of light-diffusing screen is illustrated in Fig. 7 wherein a film of polyvinyl alcohol such as described above is laminated to one side of a suitable transparent substrate 30 and the opposite side of substrate 30 is provided with a reflective coating 31. Light would then enter the cylindrically shaped ridges or configurations 11 of film 10, pass through substrate 30 and be reflected by the reflective backing 31 outwardly through others of said ridges or configurations 11 to produce a diffusing and substantial uniform illumination of said screen in predetermined directions substantially normal to the direction of alignment of said ridges or configurations 11.

It is particularly pointed out that only a few possible modified forms of the invention have been shown for purposes of illustrating its usefulness. However, it should be appreciated that a directional light-diffusing means of the above-described character would have unlimited possibilities in the field of optics particularly when used as projection screens, view finders or other similar means.

In Fig. 8, there is shown a further modification of the invention wherein the film 10b is placed on a suitable rotatable roll or cylinder 29 with its outer relief surface 10c forming, in effect, an embossing roll. A second roll or cylinder 30 is positioned below the cylinder 29 and heated sheet material 26b is passed between cylinders 29 and 30 by rotating same in directions opposite to each other. This is accomplished by the use of drive means, not shown. The relief surface 10c of film 10b can, in this manner, be impressed into the heat-softened surface of sheet 26b to form an intaglio 26c of the original relief. It is obvious, however, that cylinder 30 could also be provided with a film 10b, in the manner described for cylinder 29, so as to simultaneously produce a surface texture such as 26c on the opposite side of sheet 26b, if desired. It is also pointed out that, although the sheet material 26b is described as being heat-softened upon entering rollers 29 and 30, an intaglio of the relief surface 10c could also be produced upon said sheet material 26b by applying a suitable solvent to the side surface thereof to be impressed by roller 29 or rollers 29 and 30, as the case may be. This solvent would, of course, soften the surface or surfaces of the sheet material 26b to which it is applied. However, it is important that the type of solvent used for this purpose must be selected in accordance with the type of material used for sheet material 26b. That is, for vinyl materials an organic solvent must be used whereas for acetate materials, a solvent such as acetone must be used and must be such as not to attack the film 10b.

In order to emphasize the novel light-diffusing characteristics of the devices of the present invention, Figs. 9 and 10 illustrate a plot of the light-transmission characteristics of a single sheet of the light-diffusing material 10 and of a composite structure formed of two superimposed sheets of said material 10 having the surface configurations 11 of each of said sheets in off-axis relation with each other by substantially 45°. For comparison with other known light-diffusing mediums, Figs. 9 and 10 also include a plot of the transmission characteristics of a ground glass having its light-diffusing surface formed with No. 302 grade emery and a plot of the light-transmission characteristics of a Plexiglas light-diffusing material which has heretofore been considered as being the best known light-diffusing material particularly for use as rear projection screens or the like. This Plexiglas material is known commercially as "Plexiglas W-2067" and is manufactured by Rohm and Haas of Philadelphia, Pennsylvania. The thickness of the Plexiglas used for purposes of this illustration was chosen to be .060 inch. In Figs. 9 and 10, the characteristics of the single sheet of light-diffusing material 10 of the invention is illustrated by a — · — line, the characteristics of the composite structure of superimposed sheets of light-diffusing material of the invention is illustrated by a — o — line, the characteristic of the ground glass material is illustrated by a — ⊙ — line and the characteristics of the Plexiglas material is illustrated by a — x — line. Furthermore, it is pointed out that Fig. 9 illustrates the light-transmission characteristics of the above-mentioned specimens in the horizontal meridian and Fig. 10 illustrates the transmission characteristics thereof in the vertical meridian. With particular respect to the above-mentioned laminated specimen, the vertical meridian is taken along an axis subdividing the 45° angle between axes of the superimposed sheets thereof and the horizontal meridian is taken normal to said vertical axis.

It will be noted from Figs. 9 and 10 that all of the curves for the various specimens plotted thereon have been normalized. That is, for purposes of more clearly illustrating the comparative light-spreading characteristics of the various specimens, all of the curves have been calculated to coincide at both the zero and 100% axial transmission points on the charts. However, it is pointed out that by selecting the ground glass as a basis of comparison for the other above-mentioned specimens, and arbitrarily setting its axial light-transmission value at 100 value, the material 10 of the invention (indicated by the — · — line) will actually have a relative axial transmission value of approximately 70% of the 100. Moreover, the composite structure of the invention (indicated by the — o — line) will have a relative axial light-transmission value of approximately 25% of the 100, and the Plexiglas will have a relative axial light-transmission value of approximately 17% of the 100.

Regarding more particularly the angular light-transmission values or light-spreading characteristics of the above specimens in both the horizontal and vertical meridians, it can be seen from Figs. 9 and 10 that in order to attain a 50% light-transmission value from the various specimens, said specimens must be viewed from approximately the following angles relative to the normal thereto: Ground glass, 8°, in the horizontal meridian and 8° in the vertical meridian; Plexiglas, 18° in the horizontal meridian and 18° in the vertical meridian; the single sheet of light-diffusing material of the invention, 23° in the horizontal and 3° in the vertical; the above-mentioned composite light-diffusing structure of the invention, 21° in the horizontal and 12° in the vertical.

Thus, it is very apparent that applicant's light-diffusing means produces a considerable spreading of light in the horizontal meridian, much greater than that of Plexiglas or ground glass and that it has, as a single sheeting, much less transmission along the vertical meridian than said ground glass or Plexiglas. However, this may be varied by laminating two sheets of cross-axial relation with each other, as indicated by line — o — of Figs. 9 and 10 and the extended spread will depend upon the angular relation of the axes of these respective sheetings, for example, if the sheetings are set at 90° with relation to each other the transmission for both the horizontal and vertical meridians will be substantially the same or have the same spread.

Figs. 11, 12 and 13 are provided to emphasize the novel light-diffusing characteristics of the front projection or reflective type of light-diffusing means of the invention (an example of which is illustrated in Fig. 7). In this respect, a magnesium carbonate block has been used as a basis of comparison for a film 10 of the invention. Film 10 has been treated on one side by the application of a reflective aluminum coating. In this instance, the reflective aluminum coating was applied to film 10 by an evaporation process. However, the reflective coating could be applied to film 10 by painting, spraying or any other known method so as to produce a screen having substantially the same reflective characteristics as those of the specimen graphically illustrated in Figs. 12 and 13. It is particularly pointed out that the reflective backing serves merely to reflect light entering the film 10 and that the characteristics of the surface texture on film 10 are alone responsibe for the unusual and novel reflective qualities of the specimen which are graphically illustrated in Figs. 12 and 13.

Fig. 11 graphically illustrates the reflective qualities of the magnesium carbonate block which was said to have been chosen as a basis of comparison for a reflective screen of the invention. The magnesium carbonate block, being the best known reflective material for comparison purposes, was selected principally because of its uniform light-dispersion qualities.

Referring now to Fig. 11, it can be seen that with the light incident at 0° or along an axis normal to the specimen, substantially 100% of said light will be reflected back from said specimen at an angle of approximately 30° from normal. The percentage of light reflected from the specimen will then drop off rather gradually as the angle is increased from 30°. For example, at 60° from normal, approximately 86% of the incident light will be reflected. It is particularly pointed out that the magnesium carbonate block has absolutely no means for directionally controlling the spread of the reflected light therefrom. Thus, a particular angle of reflectance in the horizontal meridian of the block will be precisely the same as if viewed in the vertical meridian. For this reason, Fig. 11 illustrates the reflective characteristics of the magnesium carbonate block whether taken in the horizontal or the vertical meridian, both being the same.

As a comparison of the light-spreading characteristics of the reflective screen of the invention with the magnesium block, the curves of Figs. 12 and 13 have been normalized in a manner generally similar to that described for Figs. 9 and 10. In this respect, it is particularly pointed out that the reflection of the screen of the invention for normally incident light is 6.25 times that of the magnesium carbonate block at an angle of 30° from the normal thereto. With this in mind, it can be seen from Figs. 11 and 12 that in the horizontal meridian, the reflective screen of the invention will have (Fig. 12) a spread somewhat greater than that of the magnesium carbonate block (Fig. 11) particularly when viewed, for example, at an angle of 60° from normal.

The more spectacular feature of the screen of the invention, however, lies in its ability to substantially reduce the spread of light in its vertical meridian to a practical minimum as can be seen by comparing Fig. 13 with Fig. 12. This, of course, accounts for the fact that for normally incident light, the reflection of the screen of the invention at a 30° angle relative to the normal thereto is 6.25 times that of the magnesium carbonate block. By so directionally controlling the spread of reflected light from the screen of the invention so as to cause mostly all of said light to be horizontally spread, as shown by Figs. 12 and 13, the brilliance of the horizontally spread light becomes 6.25 times that of the magnesium carbonate block at said 30° angle. The magnesium carbonate block, of course, spreads the light substantially equal amounts in both its horizontal and vertical meridians.

It is pointed out that due to mechanical limitations of the goniometer or apparatus used to measure the reflective characteristics of the above-mentioned specimens, the dotted parts of the curves of Figs. 11 and 12 have been extrapolated to only give an estimate of the reflective characteristics represented by that portion of the curves. Also, for reasons of mechanical limitations, the incident light as graphically shown in Fig. 13 is directed to the specimen at an angle of 25° from normal. However, if it were possible to direct the light along an axis normal to the specimen, a curve or plot of its reflective characteristics in the vertical meridian would be substantially the same as that shown but aligned with the 0° line rather than the 25° line. In such a case, it can be seen that a maximum spread of approximately 5° each side of the normal would result.

From the above, it can be seen that the characteristics of the reflective screen of the invention are generally similar to those of the transmission characteristics of the sheeting graphically shown in Figs. 9 and 10. It is pointed out that by laminating a pair of sheets or films 10 together in cross-axial relation with each other and providing a reflective backing on one side of such a structure, the extended spread of reflected light therefrom, in any desired meridian, could be controlled in a manner analogous to that shown and described for the device of Fig. 5.

From the foregoing, it can be seen that simple, improved and economical means and method have been provided for accomplishing all the objects and advantages of the invention and that the invention should not be limited to the exact matters shown and described as only the preferred matters have been given by way of illustration.

Having described my invention, I claim:

1. The method of making light-diffusing means comprising immersing a film of polyvinyl alcohol in a solution of boric acid and water for a time sufficient to render the film elastic, subjecting said film to a stretching force of a controlled amount, removing the film from said solution while retaining said force on said film, allowing said film to dry at room temperature and thereafter heating the film above room temperature while releasing said force by an amount sufficient to permit a relatively rapid retraction of the material of said film to produce on at least one of its surfaces a plurality of raised elongated microscopic configurations of irregular size, shape and spacing with their axes of greatest length in substantially similar directional relation with each other to thereby render said film directionally light-diffusing.

2. The method of making light-diffusing means comprising imbibing a polyvinyl alcohol film in a 2 to 10 percent solution of boric acid and water, stretching said film within controlled limits, removing the film from said solution, allowing said film to dry at room temperature while maintaining it in its stretched state, heating the film above room temperature and releasing the stretching force by an amount to permit relatively rapid retraction thereof and produce a plurality of elongated microscopic configurations on each side of said film, said configurations being irregular in size, shape and spacing with their axes of greatest length arranged in substantially similar directional relation with each other.

3. Light-diffusing sheet material produced by the method defined in claim 1.

4. The method of making light-diffusing means comprising imbibing a polyvinyl alcohol film in a 2 to 10 percent solution of boric acid and water, stretching said film within controlled limits by subjecting the same to a pulling force, removing the film from said solution and drying same at room temperature while retaining it in said stretched state, heating the film above room temperature while releasing said pulling force an amount sufficient to cause a relatively rapid retraction of the material of said film and produce a plurality of raised elongated microscopic configurations on each side of said film, the size of said raised configurations being controlled in accordance with the amount to which said pulling force is released, said configurations being irregular in size, shape and spacing while arranged with their axes of greatest length in substantially similar directional relation with each other and laminating said film to one side of a suitable substrate.

5. The method of making light-diffusing material comprising the steps of immersing a plastic film of polyvinyl alcohol in a heated solution of boric acid and water, the concentration and temperature of said solution being as to render the film highly elastic, stretching said film under force in one direction a predetermined amount while in said boric acid solution to elongate and orient the molecular structure thereof, maintaining said stretching force on the film while removing said film from said boric acid solution, wiping the stretched film to remove excess boric acid solution left thereon, drying the wiped film at room temperature, heating said film above room temperature while simultaneously releasing said stretching force by an amount sufficient to limit the extent of the contraction of said film so as to form microscopic raised configurations on the surfaces of said film of a size controlled in accordance with the extent to which said film is heated above room temperature and the extent to which said film is permitted to contract so as to produce by said heating and contraction a desired light-diffusing surface texture thereon on said film.

6. The method of making light-diffusing material comprising the steps of immersing a plastic film of polyvinyl alcohol in a 2 to 10 percent solution of boric acid and water which is maintained within a range of temperatures of from 100° to 150° Fahrenheit, causing said film to remain in said boric acid solution for a period of time sufficient to render same highly elastic, stretching said film under force in one direction a predetermined amount while in said boric acid solution to elongate and orient the molecular structure thereof, maintaining said stretching force on the film while removing said film from said boric acid solution, wiping the stretched film to remove excess boric acid solution left thereon, drying the wiped film at room temperature, causing said film to contract by heating same to a temperature within the range of from 250° to 280° Fahrenheit while simultaneously releasing said stretching force by an amount sufficient to permit a predetermined contraction of said film so as to produce by said contraction a desired microscopically ridged light-diffusing surface texture thereon the coarseness of which is controlled in accordance with the extent to which said film is heated and permitted to contract.

7. The method of making a strip of light-diffusing material comprising providing a supply of polyvinyl alcohol film material in strip form, passing said film through a bath of 2 to 10 percent boric acid solution to render said film highly elastic, stretching said film along its longitudinal meridian while passnig through said bath to elongate and orient the molecular structure thereof, maintaining said stretched condition of said film while passing said film from said boric acid solution and wiping same to remove excess boric acid solution, drying said film in said wiper and stretched state at room temperature, further passing said dried and stretched film over heat of from 250° to 280° Fahrenheit and allowing contraction thereof within controlled limits to produce a desired microscopically ridged light-diffusing surface texture thereon, the coarseness of which is controlled in accordance with the extent to which said film is heated and permitted to contract.

8. The metthod of making light-diffusing material comprising the steps of providing a plastic film of polyvinyl alcohol, heating said film an amount sufficient to render same highly elastic, stretching said film within controlled limits to elongate and orient the molecular structure thereof, boricating said film by immersion in a heated solution of boric acid, maintaining said stretched condition of the film while removing same from said boric acid solution, wiping the stretched film to remove excess boric acid solution, drying the wiped and stretched film at room temperature, heating said film above room temperature to cause said film to contract while allowing contraction thereof and limiting the extent of the contraction of said film so as to produce a desired raised light-diffusing surface texture thereon, the coarseness of which is controlled in accordance with the extent to which said film is heated and the extent to which said film is permitted to contract.

References Cited in the file of this patent

UNITED STATES PATENTS

| | | |
|---|---|---|
| 1,885,208 | Koeppe | Nov. 1, 1932 |
| 1,983,626 | Lytle | Dec. 11, 1934 |
| 2,232,551 | Merton | Feb. 18, 1941 |
| 2,248,638 | Merton | July 8, 1941 |
| 2,321,635 | Taylor | June 15, 1943 |
| 2,360,650 | Crane | Oct. 17, 1944 |
| 2,373,215 | Young | Apr. 10, 1945 |
| 2,421,624 | Kline | June 3, 1947 |
| 2,445,555 | Binda | July 20, 1948 |
| 2,445,579 | Hyman et al. | July 20, 1948 |
| 2,508,058 | Bradley | May 16, 1950 |
| 2,509,279 | Sisson | May 30, 1950 |
| 2,510,344 | Law | June 6, 1950 |
| 2,547,736 | Blake | Apr. 3, 1951 |